United States Patent [19]

Bann et al.

[11] 4,426,205
[45] Jan. 17, 1984

[54] NOVEL RED DYES FOR FIBERGLASS AND PAPER

[75] Inventors: Robert F. Bann; John E. Innes, both of Marietta, Ohio

[73] Assignee: American Cyanamid Company, Stamford, Conn.

[21] Appl. No.: 451,697

[22] Filed: Dec. 20, 1982

[51] Int. Cl.$^3$ .............................................. D06P 3/80
[52] U.S. Cl. ........................................ 8/523; 8/641; 8/644; 8/919; 260/184; 260/191
[58] Field of Search ................... 8/523, 641, 644, 919

[56] References Cited

U.S. PATENT DOCUMENTS

| | | | |
|---|---|---|---|
| 377,349 | 1/1888 | Ceresole | 549/227 |
| 377,350 | 1/1888 | Ceresole | 549/227 |
| 516,584 | 3/1894 | Bernthsen | 549/227 |
| 4,019,858 | 4/1977 | Conger | 8/527 |
| 4,227,879 | 10/1980 | Huffman | 8/602 |

Primary Examiner—A. Lionel Clingman
Attorney, Agent, or Firm—Charles J. Fickey

[57] ABSTRACT

A red dye composition comprising the dye compound

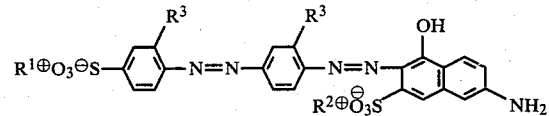

wherein $R^{1\oplus}$ and $R^{2\oplus}$ are alkali metal cations or ammonium ions of a lower alkylol amine, and $R_3$ is hydrogen or lower alkyl, and at least one rhodamine dye.

10 Claims, No Drawings

NOVEL RED DYES FOR FIBERGLASS AND PAPER

This invention relates to a novel red dye composition, and to a process for its use. More particularly, it relates to a solution of dyes which is stable on storage and is suitable for dyeing paper, and fiberglass products with the aid of a synthetic resin binder.

Red dye solutions, which are useful for dyeing glass fibers, in combination with a synthetic resin of the phenolic type, are disclosed by Conger, Sr., in U.S. Pat. No. 4,019,858, and Huffman in U.S. Pat. No. 4,227,879. These dye solutions have a high tinctorial value, and are compatible with the phenolic binder. However, these dye solutions lose about one-half of their tinctorial strength and change to a more orange red shade when exposed to heat on fiberglass.

There is a need for a dye composition, having a high tinctorial strength, that is heat stable and imparts a bluer shade red on fiberglass and paper.

It is an object of this invention, therefore, to provide a liquid dye composition which meets the above needs. These needs are met by the present invention whereby there is provided a red dye solution comprising a mixture of a dye of formula (I),

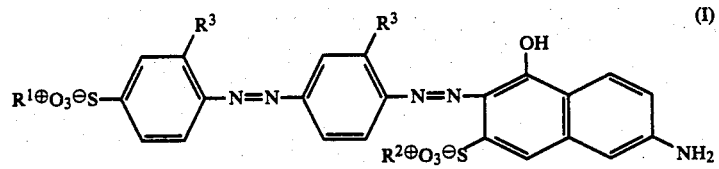

wherein $R^{1\oplus}$ and $R^{2\oplus}$, which may be the same or different, represent an alkali metal cation, or an ammonium ion of a base selected from diethanolamine, triethanolamine, monoethanolamine, dimethylethanolamine, diisopropanolamine, and the like, and $R^3$ represents hydrogen, or $C_1$–$C_3$ alkyl, and a Rhodamine dye, or mixture of Rhodamine dyes, of formulas (II), (III), or (IV), with the balance being a mixture of water, urea, and by-product salts.

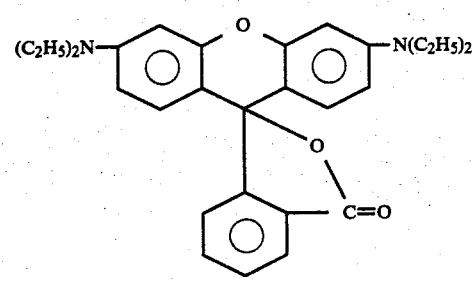

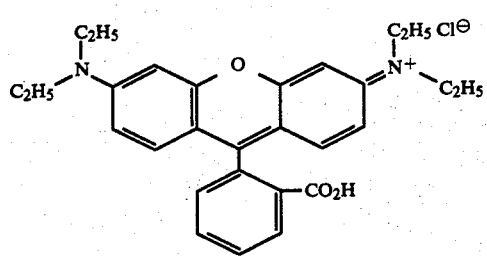

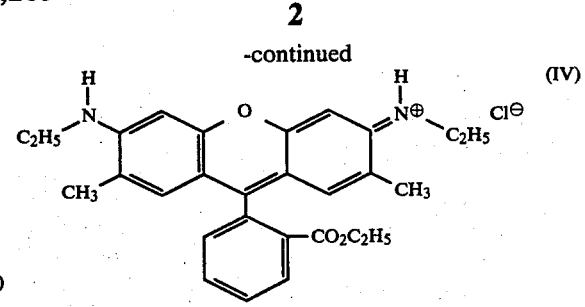

The red dye composition of this invention comprises a liquid mixture of about 5 to 20% by weight of real dyes of formulas (I) and (II), (III), or (IV), wherein the mole ratio of Rhodamine dye to dye of formula (I) ranges from about 0.01 to 1.0.

In the preferred embodiment the dye composition comprises a liquid mixture of about 7 to 15% by weight of real dyes of formulas (I) and (II), (III), or (IV), wherein the mole ratio of Rhodamine dye to dye of formula (I) ranges from about 0.10 to 0.35.

In the especially preferred embodiment the Rhodamine dye is the compound of formula (II).

The invention also comprises processes for dyeing fiberglass and paper with the above-described dye compositions, and the dyed products thus obtained.

The dye compositions of the present invention are higher in tinctorial strength, bluer in shade, and more heat stable than the compositions of the prior art. These improvements are most likely due to the formation of a salt, or complex, by the combination of the two dyes. However, we do not wish to be bound by this conclusion.

DESCRIPTION

The dye compounds of formula (I) are well-known. They are readily prepared by procedures disclosed by Conger, Sr., in U.S. Pat. No. 4,019,858, and Huffman in U.S. Pat. No. 4,227,879. Sufficient urea is added to prevent the dye from crystallizing from solution at low temperatures. Water is then added to obtain a concentration of about 1–20% real dye and about 2–30% of urea and salts formed in the reaction. Preferably, water is added to obtian about 10–15% real dye, and about 17–23% urea and process salts.

The Rhodamine dye of formula (II), Rhodamine B free base (Colour Index 45170:1), a well-known pigment, can be prepared by heating a stirred mixture of 10 parts by weight of m-diethylaminophenol and 12 parts by weight of phthalic anhydride to 175° C. under a blanket of carbon dioxide. The reaction mixture is stirred at 170°–175° C. for a period of 6–7 hours, then cooled to 40° C. and discharged into water. The pH of the resulting slurry is adjusted to 12 by adding caustic soda, and the insoluble material is recovered by filtration. The filter cake is then rinsed with water and dried to obtain Rhodamine B Base in a yield about 90% of theoretical.

The Rhodamine dye of formula (III), Rhodamine B (Colour Index 45170), also known as Basic Violet 10, and the Rhodamine dye of formula (IV), Rhodamine 6G (Colour Index 45160), also known as Basic Red 1, are well-known in the art.

The application of the dye compositions of the present invention to paper and fiberglass is carried out by conventional methods. In applying the dye solution to fiberglass, the pH of the solution must be equal to, or greater than, 7 to be compatible with resinous binders used in the art.

The following examples are illustrative of the present invention. All parts and percentages are by weight unless otherwise indicated.

EXAMPLE 1

4-Aminoazobenzene-4'-sulfonic acid (66 grams real) is slurried in 240 mls of water, containing 0.9 gram of Tamol SN (sodium salt of condensed naphthalenesulfonic acid) and 0.9 gram of Surfonic N-95 (alkylarylpolyethyleneglycol ether) to aid in making a smooth slurry. To this slurry is added 66 grams of 31% hydrochloric acid over a period of 45 minutes, and the resulting mixture is stirred for 2 hours. To this slurry is added 72 grams of a 25% aqueous solution of sodium nitrite over a period of 2-3 hours at a temperature between 15°-30° C. Following diazotization, the reaction mixture is stirred until a thin slurry results.

With stirring, 1-hydroxy-6-aminonaphthalene-3-sulfonic acid (60 grams) is added to 162 mls of water followed by the addition thereto of 93 grams of 85% triethanolamine, and the resulting mixture is stirred at room temperature to effect dissolution. The diazo slurry is then added uniformly to the solution over a period of 30-45 minutes. After the addition is completed, stirring is continued for 1.5 hours before adding 192 grams of urea. The mixture is then stirred for another hour, and diluted with water to provide a solution containing 9.5-11.0% real dye, and 14-16% urea, and having a dye strength 100% of type.

EXAMPLE 2

A dye formulation is prepared by mixing 49.0 grams of the product of Example 1 and 1.0 gram of Rhodamine B free base.

Spectrophotometric analysis of the visual spectrum of the above dye formulation shows that it has a dye strength of 120-121% versus 100% for the product of Example 1.

EXAMPLE 3

The dye solution of Example 2 is mixed with an aqueous solution of a phenol-formaldehyde resin and the mixture is sprayed onto a fiberglass batting. The batting is then heated for 3 minutes in an oven at 450° F. to cure the resin. The fiberglass thus dyed has a more attractive bluer shade red than a corresponding dyeing obtained with the dye solution of Example 1.

Similar results are obtained by substituting 1.0 gram of Rhodamine B, or Rhodamine 6G, for the Rhodamine B free base in the dye solution of Example 2.

EXAMPLE 4

A dye formulation is prepared by mixing 49.5 grams of the product of Example 1 and 0.5 gram of Rhodamine B free base, and diluting the mixture with 25 grams of water.

A portion of the dye formulation (1.0 gram) is diluted with water to 1000 mls, and an aliquot (50 mls) of the diluted solution is further diluted with water to 1000 mls. A piece of white blotter paper is immersed in the final solution for 30 seconds, removed therefrom, and placed in a forced-air oven at 450° F. for 5 minutes. The dyed paper is then removed from the oven and evaluated for shade and dye strength by visual examination.

In the manner described above, a comparison formulation is prepared by mixing 50 grams of the product of Example 1 and 25 grams of water. The comparison formulation is then diluted and applied to blotter paper as described above.

Visual examination of the strips of treated paper shows that the dye formulation containing Rhodamine B free base is bluer and 30-50% stronger than the comparison formulation.

Similar results are obtained by substituting 0.55 gram of Rhodamine B, or Rhodamine 6G, for the Rhodamine B free base.

EXAMPLE 5

A dye composition is prepared by adding 1.5 grams of a 35% solution of Rhodamine B free base to 49.5 grams of the product of Example 1, and diluting the resulting mixture with 24.0 grams of water to obtain a composition containing 66% by weight of the product of Example 1 and 0.7% by weight of Rhodamine B free base. A portion of the diluted composition (3.0 grams) is further diluted with water to a final weight of 300 grams, and dipped with strips of pressed board paper.

In the manner described above, a comparison formulation is prepared by stirring 50.0 grams of the product of Example 1 and 25.0 grams of water. A portion of the comparison formulation (3.0 grams) is further diluted with water to a final weight of 300 grams, and dipped with strips of pressed board paper.

The treated strips of paper are then evaluated for heat stability on a THERMOTEST ® (Rhodiaceta Model) (D.A.M. Lyon-Vaise, France). Visual examination of the treated strips of paper after exposure to heat shows that the paper treated with the dye formulation containing Rhodamine B free base sustains a slight break at 428° F., and a definite break at 446° F. The paper treated with the comparison formulation sustains a slight break at 405° F., and a definite break at 428° F. Thus, the composition of the present invention is superior to the comparison composition in heat stability.

What is claimed is:

1. A red dye composition comprising the dye compound

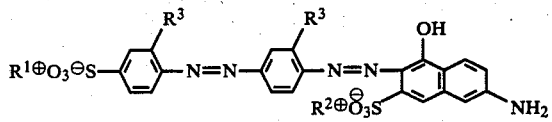

wherein $R^{1\oplus}$ and $R^{2\oplus}$ are alkali metal cations or ammonium ions of a lower alkylol amine, and $R_3$ is hydrogen or lower alkyl, and at least one rhodamine dye.

2. The red dye composition of claim 1 wherein $R^{1\oplus}$ and $R^{2\oplus}$ are sodium ions and $R_3$ is hydrogen.

3. The red dye composition of claim 1 wherein $R^{\oplus}$ and $R^{2\oplus}$ are tris(2-hyroxyethyl) ammonium ions and $R_3$ is hydrogen.

4. The red dye composition of claim 1 wherein the rhodamine dye is a compound of the formula 5. The red dye composition of claim 1 wherein the rhodamine dye is a compound of the formula

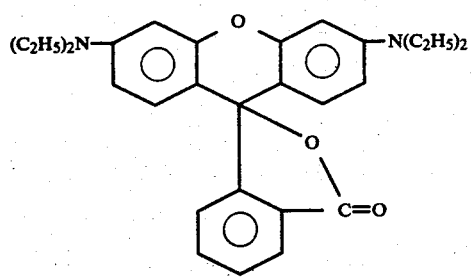

6. The red dye composition of claim 1 wherein the rhodamine dye is a compound of the formula

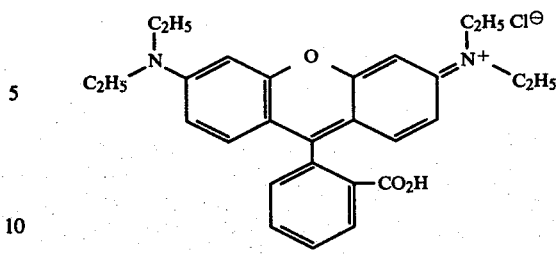

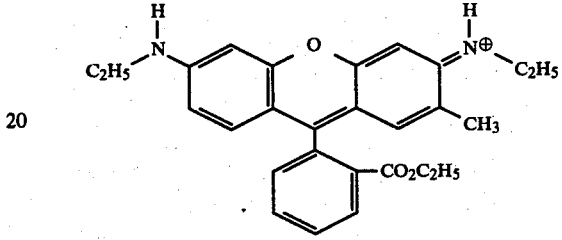

7. The red dye composition of claim 1 comprising water and urea.

8. A method for dyeing paper and fiberglass which comprises applying the dye composition of claim 7.

9. The method of claim 8 wherein the dye solution is at a pH of at least 7.

10. A paper or fiberglass substrate dyed with the composition of claim 7.

* * * * *